(12) United States Patent
Greer et al.

(10) Patent No.: US 9,551,817 B2
(45) Date of Patent: Jan. 24, 2017

(54) COMPOSITE PARTICLES FOR OPTICAL BANDPASS FILTERS

(75) Inventors: Edward Greer, Lower Gwynedd, PA (US); Brian Einsla, Chalfont, PA (US); Susan Fitzwater, Ambler, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 12/970,042

(22) Filed: Dec. 16, 2010

(65) Prior Publication Data

US 2011/0249324 A1 Oct. 13, 2011

Related U.S. Application Data

(60) Provisional application No. 61/284,748, filed on Dec. 23, 2009.

(51) Int. Cl.
*B82Y 30/00* (2011.01)
*G02B 5/20* (2006.01)

(52) U.S. Cl.
CPC .............. *G02B 5/208* (2013.01); *G02B 5/206* (2013.01); *Y02E 10/52* (2013.01)

(58) Field of Classification Search
CPC .......... B82Y 30/00; B82Y 40/00; B82Y 5/00; B82Y 10/00; B82Y 15/00; B82Y 20/00; A61L 2300/624; A61L 2400/12; A61L 17/145; A61L 2/232; C09D 5/1693; C04B 41/89; G02B 1/115; G02B 1/118; G02B 2207/101
USPC ...... 428/220, 327, 323, 1, 338, 402–402.24, 428/403, 404, 407, 411.1; 427/389.9, 427/213.3–213.36, 483, 256; 264/1.27, 264/534, 4–4.7; 424/400, 408, 450, 451, 424/455, 93.7, 184.1, 497, 489, 501, 490, 424/491, 492, 493, 494, 495; 136/250, 136/256, 263
See application file for complete search history.

(56) References Cited

U.S. PATENT DOCUMENTS

| | | | |
|---|---|---|---|
| 3,826,670 A | 7/1974 | Rees | |
| 4,725,460 A | 2/1988 | Matsuo et al. | |
| 5,318,628 A * | 6/1994 | Matijevic | C09B 67/0013 106/442 |
| 6,221,945 B1 | 4/2001 | Kuno et al. | |
| 6,288,837 B1 * | 9/2001 | Hubbard | 359/359 |
| 6,870,661 B2 * | 3/2005 | Pullen | G02F 1/167 204/600 |
| 7,033,524 B2 * | 4/2006 | Kumacheva | C08J 9/32 252/500 |
| 7,130,107 B2 * | 10/2006 | Liu | B01J 13/16 204/471 |
| 7,341,778 B2 | 3/2008 | Nakashima et al. | |
| 2002/0017633 A1 | 2/2002 | Goulding et al. | |
| 2003/0021983 A1 * | 1/2003 | Nohr | B41M 5/5218 428/327 |
| 2003/0030041 A1 | 2/2003 | Genjima et al. | |
| 2003/0091814 A1 | 5/2003 | Benz et al. | |
| 2003/0215627 A1 | 11/2003 | Rosenberger et al. | |
| 2004/0071957 A1 | 4/2004 | Fujita | |
| 2008/0262141 A1 | 10/2008 | Cser | |
| 2009/0015908 A1 | 1/2009 | Ando et al. | |
| 2009/0155371 A1 | 6/2009 | Sojka et al. | |
| 2010/0047555 A1 * | 2/2010 | Kawai | C01B 33/12 428/323 |
| 2011/0076484 A1 * | 3/2011 | Kawai et al. | 428/328 |

FOREIGN PATENT DOCUMENTS

| | | |
|---|---|---|
| GB | 2447497 | 9/2008 |
| JP | EP1424571 | 6/2004 |
| JP | WO2008041382 | 4/2008 |
| JP | 2008180798 | 8/2008 |
| JP | 2009020437 | 1/2009 |
| WO | WO03069403 | 9/2003 |
| WO | WO2005072947 | 8/2005 |

OTHER PUBLICATIONS

Roush, Ted L.; Near-infrared optical constants estimated for montmorillonite; Icarus, Academic Press San Diego, CA, US vol. 179.n0 1, Dec. 1, 2005 pp. 259-264.
D. M. Shamoon, J.M.H. Elmirghani, R.A.Cryan—Characterisation of optically preamplified receivers with fibre Bragg grating optical fibers—IEE Colloquium on Optical Fiber Gratings, Mar. 1996.
Berning and Turner—Induced Transmission in Absorbing Films Applied to Band Pass Filter Design—J.Opt. Soc. Am 74, 3, 230-239.
A. E. Bailey, D. S. Cannell—Phys. Rev E, 1994, 50, 4853-4864.
Cipelletti, L.—Phys. Rev. E, 1997, 55, 7733-7740.

* cited by examiner

*Primary Examiner* — Douglas McGinty
(74) *Attorney, Agent, or Firm* — Tifani M. Edwards

(57) ABSTRACT

The present invention relates to composite polymeric particles for use as infrared reflectors in optical bandpass applications.

5 Claims, 3 Drawing Sheets

—□— 100 nm TiO2 Shell on HSP
—○— 100 nm TiO2 Shell on Solid Bead
—△— 100 nm TiO2 Particle + Solid Bead

COMPOSITE PARTICLES FOR OPTICAL BANDPASS FILTERS

This application claims the benefit of priority under 35 U.S.C. §119(e) of U.S. Provisional Patent Application No. 61/284,748 filed Dec. 23, 2009.

The present invention relates to composite polymeric particles for use as infrared reflectors in optical bandpass applications.

Optical bandpass filters transmit light over a pre-determined band of wavelengths while rejecting, by absorption, radiation or scattering, all other wavelengths. Such filters are useful in for example, solar panels, laser cavities or optical communications systems. For example, they may be used to constrain the wavelength of operation of a laser, when deployed inside or outside the laser cavity. In optical communications systems, they can be used at the input of an optical receiver to separate unwanted light such as spontaneous emission noise outside the wavelength band of the signal. See D. M. Shamoon, J. M. H. Elmirghani, R. A. Cryan, "Characterisation of optically preamplified receivers with fibre Bragg grating optical fibers", *IEEE Colloquium on Optical Fiber Gratings*, March 1996.

In certain applications it is desirable to reflect or backscatter rather than absorb the unwanted radiation. For example, if infrared radiation is to be rejected, absorbing it can lead to heating of the filter and other nearby components, while reflection or backscattering will not. In the prior art, various approaches have been favored for providing filters which transmit all, or some portion, of the visible spectrum and reflect infrared radiation.

These basic approaches are well known to those skilled in the art, accordingly they are discussed only briefly below.

A first approach involves depositing multilayer interference bandpass filters comprising, entirely, dielectric layers.

Multilayer bandpass filters may be in the form of multiple cavity or multiple half-wave bandpass filters, which include a combination of alternating high and low refractive index dielectric layers, some of which have an optical thickness of about one quarter-wavelength at a particular wavelength, and some of which have an optical thickness of one-half of that wavelength. The wavelength at which the layers are one-quarter or one-half wavelength thick is generally designated the center wavelength, and generally corresponds to the frequency center of the wavelength range to be passed by the filter.

Multilayer bandpass filters may also be in the form of combination of long and short wavelength pass filters, often termed edge filters. The combination generally includes at least one filter defining a short wavelength edge and designed to pass wavelengths longer than the short wavelength edge, and one filter defining a long wavelength edge and designed to pass all shorter wavelengths.

An advantage of all dielectric filters is that, because of the very low absorption possible in dielectric layers, transmission may be very high. Transmission may be limited essentially by the degree to which reflection can be reduced in the wavelength range to be passed by the filters.

A disadvantage of all-dielectric filters is that as many as twenty layers may be required to provide an adequately steep transition from a reflecting region, or stop region, to a transmission region. Fifty or more layers may be required to extend a stop region over a wide band of wavelengths. Extended stop regions are a particular problem for wavelengths longer than the wavelength region to be passed, as layers must be made increasingly thicker to block increasingly longer wavelengths. Further, complex layer configurations are required to prevent high order reflection bands of long wavelength blocking layers from appearing in the wavelength range to be passed.

A second approach to the deposition of multilayer bandpass filters was proposed in a paper "Induced Transmission in Absorbing Films Applied to Band Pass Filter Design", Berning and Turner, J. Opt. Soc. Am. 74, 3, 230-239. In this approach, a metal layer, preferably a silver layer, is bounded on either side by multilayer dielectric reflecting layer systems comprising stacks of alternating high and low refractive index layers, each about one-quarter wavelength optical thickness at about the center of a wavelength range to be passed. On the long wavelength side of this range, the metal layer provides the desired blocking reflection. Such filters are generally termed induced transmission filters. Transmission is essentially "induced" through the metal layer by the quarter-wave multilayer stacks, which reduce reflection from the metal layer in the wavelength range to be passed.

Such filters were originally proposed as suitable for passing limited wavelength ranges, and were used, for example, as color filters in electro-optical systems. They are now used in a very simple form as low-emissivity (heat retaining) coatings for architectural glazing. In this simple form the metal layer is relatively thin, for example, about 10 nanometers (nm), and the dielectric stack is reduced to only one relatively high refractive index layer.

This simple form has a disadvantage that as the silver layer is relatively thin (for providing a pass region sufficiently wide to accommodate the visible spectrum) the filter is not effective in blocking near infrared wavelengths which make up a large proportion of the solar spectrum.

Bandpass filters can also be fabricated from conducting or semiconducting materials, for example indium tin oxide, which have a so-called plasma wavelength, as taught in WO2005072947. In this case, all wavelengths longer than the plasma wavelength are reflected. Such filters can be expensive to fabricate and have relatively narrow regions of tunability.

Wavelength-selective filters have also been fabricated using cholesteric liquid crystals. U.S. Pat. No. 4,725,460 A describes a notch filter constructed from two layers of cholesteric liquid crystal-containing films. These filters block light within a specified range of wavelengths and pass other wavelengths, so they are more properly called a notch filter than a bandpass filter. They suffer from the very high cost of cholesteric liquid crystal, and from a relatively narrow temperature range of operation.

Finally, bandpass filters have been constructed using a regularly-spaced arrangement of high-index colloidal particles in a lower index matrix, as taught in US 2009/0015908A1. This system suffers from the difficulty in creation and maintenance of a regularly-spaced arrangement of the colloidal particles.

There are a variety of uses for infrared-reflecting optical bandpass filters. One such example is photovoltaic solar cells. Photovoltaic solar cells which convert a portion of the incident solar radiation into electrical energy are an important source of electrical power. However, the efficiency of the conversion process is reduced at elevated temperatures, by approximately 0.45% per ° C. for crystalline silicon solar cells, for example. The current state of the art for crystalline silicon solar cells is approximately 25% efficiency, so 0.45% decrease per degree Celsius is quite significant.

A second non-limiting example of a use for an infrared-reflecting optical bandpass filter is in window glazing to lower the heat load on buildings, cars, and other structures. There are a number of existing ways to treat window glass to increase thermal rejection, for example the application of multilayer dielectrics, thin metal films, and dyed polymer films. These approaches significantly reduce the transmission of visible light, which may be undesirable.

Additionally, an infrared-reflecting optical bandpass filter would be beneficial if it could be incorporated into a roofing material or coated over a roof after installation. Many homeowners, for aesthetic or local ordinance reasons, prefer not to have a white or light-colored roof. A dark-colored roof which reflects infrared rays would result in significant energy savings and environmental benefit. Existing approaches to this problem involve the use of special infrared-reflective pigments. These materials are available in a very limited palette, are costly, and are in some cases highly toxic.

SUMMARY OF THE INVENTION

The present invention overcomes a number of limitations of the prior art in the construction of optical bandpass filters. First, compared with other conventional bandpass filters, the present bandpass filters have relatively higher transmission in the bandpass region. Second, because the composite polymeric particles are themselves internally structured, they can easily be fabricated into a variety of shapes and forms because they do not require the creation of a multi-layer stack of materials of different refractive index, nor the creation and maintenance of a structured colloid or liquid crystal. In particular, the particles can be added to a binder material and easily applied as a coating upon a variety of substrates. Third, the present bandpass filters are more rugged, impact resistant, and flexible than certain filters of the prior art.

The present invention provides an optical bandpass filter comprising a composite particle wherein the composite particle comprises a polymer and a high refractive index material.

DETAILED DESCRIPTION OF THE INVENTION

Figure 1:
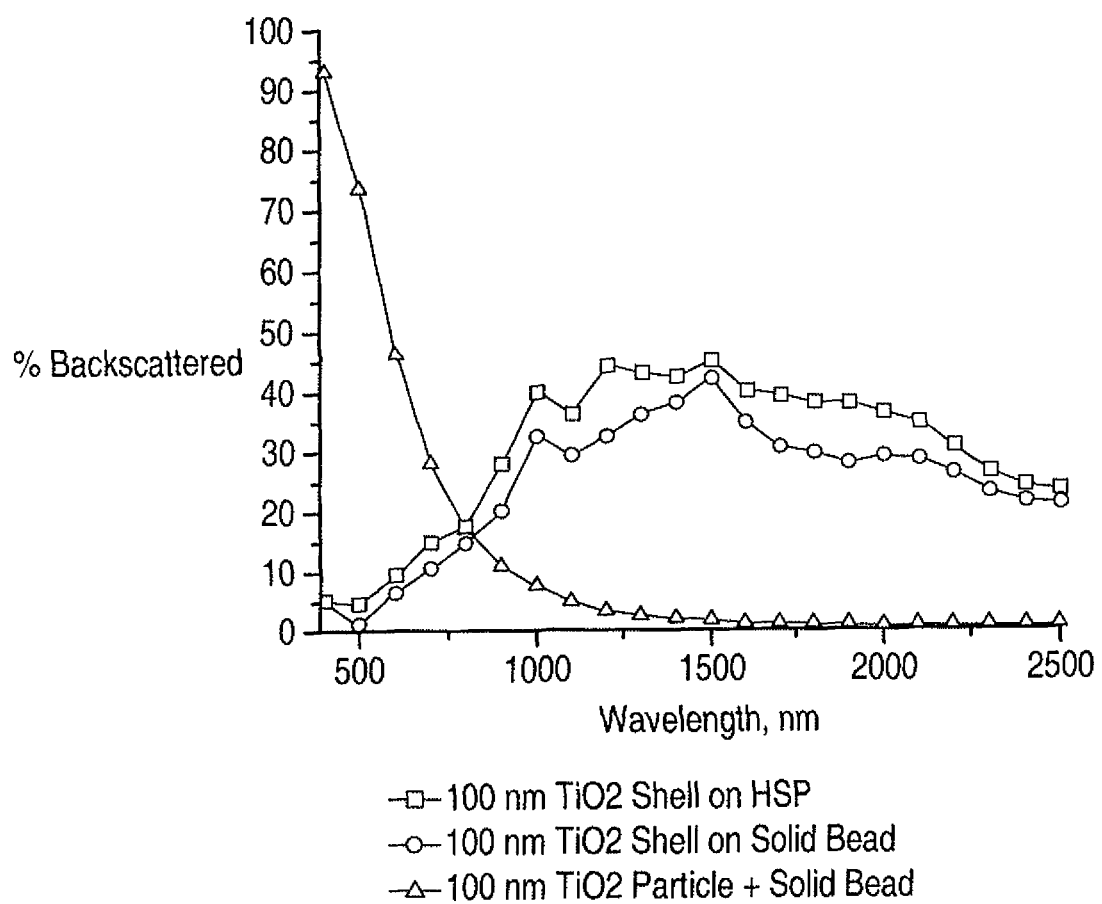
FIG. 1 shows theoretical calculations of backscattering of various bead types where the $TiO_2$ particle has a diameter=100 nm

As used herein by "optical bandpass filter" is meant a device which allows light of certain wavelengths to pass through with minimal absorption, while reflecting or backscattering light of other specific wavelengths, again with minimal absorption.

Nonlimiting applications of optical bandpass filters include blocking infrared radiation in windows, skylights, and other types of glazing to keep buildings and vehicles cool, as infrared filters for CMOS and CCD camera imaging sensors to prevent unwanted spectral response, as infrared reflectors in roofing systems to keep houses cool in the summer, and as infrared reflectors in solar photovoltaic modules to increase their performance by keeping them cool without blocking useful light.

As used herein by "high refractive index" is meant having a refractive index of at least 2.3.

As used herein by "infrared" is meant light having wavelengths between 750 nm and 25,000 nm.

As used herein by "visible light" is meant light having wavelengths from 380 nm to 750 nm.

This invention relates to composite particles useful as optical bandpass filters. The composite polymeric particles of the present invention are comprised of a polymeric particle having a diameter ranging from 100 nm to 3.5 microns, alternatively from 500 nm to 2 microns and further alternatively from 900 nm to 1.5 microns. This polymeric particle has a calculated glass transition temperature ("$T_g$") greater than 50° C.; alternatively greater than 75° C.; and further alternatively greater than 90° C. The polymeric particles may be solid bead particles.

In one embodiment, the polymeric particle may include a core and a shell. Optionally, the core, when dry, may include at least one void. As used herein, by "void" is meant a region in which the refractive index varies from that of the shell by at least X, where X is at least 0.3, alternatively at least and the shell polymer having a calculated $T_g$ greater than 50° C.

At least one material having a high refractive index is disposed on the surface of the polymeric particle. As used herein by "disposed on the surface of the polymeric particle" is meant that the high refractive index particle is bound to the surface region of the polymeric particle, i.e., held by a force in proximity to the surface of the polymeric particle, in contact with the surface of the polymeric particle including, for example, touching the surface, spread out on the surface, or embedded into the surface. Alternatively, the high refractive index shell may not be a layer of discrete particles, but could be a solid shell encapsulating the polymer particle.

Non-limiting examples of suitable high refractive index materials include titanium dioxide, cerium oxide, lead titanate, silicon, silicon carbide, lead sulfide; silicon nitride; or aluminum nitride. It is desirable that the refractive index of the polymer of the encapsulant material and the high refractive index material differ by at least 0.75, alternatively by at least 1.0, further alternatively by at least 1.1.

In an aspect of the present invention there is provided a method for forming composite polymeric particles comprising a high refractive index material bound to a polymeric particle. A first dispersion is prepared comprising a polymeric particle having a charge of one sign. The diameter of the polymeric particle ranges from 100 nm to 3.5 microns, alternatively from 500 nm to 2 microns, and further alternatively from 900 nm to 1.5 microns. The polymeric particle may comprise a core and a shell. If the polymer is of the core/shell type, the core of the polymer when dry may comprise at least one void. The polymer shell has a wall thickness of 5 nm to 1.75 microns, alternatively from 25 nm to 1 micron; and further alternatively from 50 nm to 500 nm; and a calculated $T_g$ greater than 50° C. A second dispersion is formed comprising a high refractive index material. The high refractive index material bears a charge which is the opposite of the charge of the polymeric particle. Typically, the high refractive index material of the present invention has a diameter of from 1 nm to 500 nm, alternatively from 10 nm to 350 nm, and further alternatively from 30 to 150 nm. The dispersions are then mixed by conventional methods of the art. The polymeric particles and the high refractive index materials are bound together by means of electrostatic interactions to produce the composite polymeric particles.

In another aspect of the present invention there is provided a method for forming composite polymeric particles comprising a high refractive index material bound to a polymeric particle in which there is a polyelectrolyte between the polymeric particle and the high refractive index material. The polyelectrolyte bears a charge which is the opposite of the charges of the polymeric particle and the high refractive index material. The diameter of the polymeric particle ranges from 100 nm to 3.5 microns, alternatively from 500 nm to 2 microns, and further alternatively from 900 nm to 1.5 microns. The polymeric particle may comprise a core and a shell. If the polymer is of the core/shell type, the core of the polymer when dry may optionally comprise at least one void. The polymer shell has a wall thickness of 5 nm to 1.75 microns, alternatively from 25 nm to 1 micron; and further alternatively from 50 nm to 500 nm; and a calculated $T_g$ greater than 50° C. The high refractive index material of the present invention has a diameter of from 1 nm to 500 nm, alternatively from 10 nm to 350 nm, and further alternatively from 30 to 150 nm. In one case, a dispersion of polymeric particles, a dispersion of high refractive index materials, and polyelectrolyte are mixed by conventional methods of the art. In another case, a first dispersion is prepared comprising polyelectrolyte and polymeric particles. A second dispersion is composed of high refractive index materials. The dispersions are then mixed by conventional methods of the art. In yet another case, a first dispersion is prepared comprising polyelectrolyte and high refractive index materials. A second dispersion is composed of polymeric particles. The dispersions are then mixed by conventional methods of the art. The polymeric particles and the high refractive index materials are bound together by means of electrostatic interactions to produce the composite polymeric particles.

In another aspect of the invention there is a method for forming the composite polymeric particles composed of a polymeric particle encapsulated with a high refractive index material. The diameter of the polymeric particle ranges from 100 nm to 3.5 microns, alternatively from 500 nm to 2 microns, and further alternatively from 900 nm to 1.5 microns. The polymeric particle may comprise a core and a shell. If the polymer is of the core/shell type, the core of the polymer when dry may optionally comprise at least one void. The polymer shell has a wall thickness of 5 nm to 1.75 microns, alternatively from 25 nm to 1 micron; and further alternatively from 50 nm to 500 nm; and a calculated $T_g$ greater than 50° C. The high refractive index material of the present invention has a diameter of from 1 nm to 500 nm, alternatively from 10 nm to 350 nm, and further alternatively from 30 to 150 nm. The encapsulation process involves adding the polymeric particles to a solution of soluble metal precursor, followed by precipitation and conversion to a high refractive index material on the surface of the polymeric particles. According to this method, a metal alkyloxide for example, titanium tetrabutoxide, is added to an appropriate solvent (alcohol), mixed, and heat may be applied to the solution. Polymeric particles are added to this solution and acid is optionally added. The resulting particles are filtered and placed in air at room temperature. The particles are then dried in an oven.

The composite polymeric particles may be incorporated into another material by mechanically mixing, dispersing, co-extruding, and/or other means of evenly dispersing the composite polymeric particles into the second material by any means known to those familiar in the field. Once so dispersed, the composite polymeric particles may be used as an optical bandpass filter as a liquid, a coating, a film, or as a bulk solid material or any other conventional form of the art.

EXAMPLES

Example 1

Preparation of Composite Polymeric Particles using Kymene™ G3 Xcel Polymer

To a mixture of Ropaque® AF-1055 emulsion polymer (polymeric particles having a diameter of 1 micron with a core including, when dry, at least one void and a shell polymer having a calculated $T_g$ greater than 50° C.) and water, Kymene™ G3 Xcel (a cationic functional polyamide-epichlorohydrin resin, total solids=16%) was added over 1 minute with constant mixing for 5 minutes. The addition of Kymene™ G3 Xcel resulted in thickening of the Ropaque™ AF-1055 emulsion polymer. To the above mixture, S5-300B titanium dioxide slurry was added slowly with continuous mixing. After approximately 10 minutes of mixing, the particles were dried in an air circulating oven at 80° C. to remove the water. Scanning electron micrographs ("SEMs") of example 1 exhibited composite polymeric particles composed of a larger central spherical particle on which were disposed a plurality of smaller particles.

Example 2

Preparation of Composite Polymeric Particles without Kymene™ G3 Xcel Polymer

It is expected that the composite particles may also be prepared without the use of a cationic polymer, such as the Kymene™ G3 Xcel used in example 1. To a mixture of Ropaque™ AF-1055 emulsion polymer, 0.5M HCl is added to achieve a pH of ≤2. In a separate vessel, 0.5M HCl is added to a titanium dioxide slurry of S5-300B to achieve a pH of ≤2. The acidic Ropaque™ AF-1055 emulsion is then added dropwise to the acidic S5-300B slurry with continuous mixing. Once completely incorporated, the particles are then dried in an air circulating oven at 80° C.

Example 3

Preparation of Composite Polymeric Particles Using a Metal Alkoxide Precursor

Ropaque™ AF-1055 emulsion polymer was dried completely in an air circulated oven at 80° C., placed in a container and rotated for 24 hours to break up any agglomerates. Separately, a solution of titanium tetrabutoxide in ethanol was prepared under constant stirring. The dried Ropaque™ AF-1055 polymer particles were dispersed in this solution. The resulting composite polymeric particles were filtered, placed in air at room temperature, and then dried in an air circulated oven at 80° C.

Example 4

Preparation of a Composite Particle-Filled Liquid Encapsulant for Photovoltaic Modules To a mixture of reactive liquid polymer (having a calculated $T_g$ less than 25° C.) and crosslinker capable of forming a solid polymer, the composite particles are added at 5% by weight with constant mixing optionally under vacuum. Once completely dispersed, mixing is stopped and the mixture is applied to a photovoltaic module as an encapsulant between the front glass and the silicon solar cells.

Example 5

Preparation of a Composite Particle-Filled Coating for Roofing Membranes

TABLE 1.1

Preparation of composite particles

| | | Example | |
|---|---|---|---|
| | | 1 | 2 |
| % solids | Component | Weight (g) | Weight (g) |
| 26.5 | Ropaque ™ AF-1055 | 50.0 | 50.5 |
| 16.0 | Kymene ™ G3 Xcel | 1.2 | — |
| 20.6 | S5-300B | 31.8 | 32.1 |
| | water | 117.0 | 117.3 |
| | % Solids | 10.0 | 10.0 |
| | Total | 200.0 g | 200.0 g |

Ropaque™ AF-1055 is a product of Dow Chemical Company. Kymene™ G3 Xcel was obtained from Hercules, Inc. (DE, USA). S5-300B (titanium dioxide slurry) was obtained from Millenium Inorganic Chemicals, A Cristal Company (Thane, France).

Comparative Example 1

Theoretical Calculations of Backscattering of Various Bead Types—$TiO_2$ Particle Diameter=100 Nm Plot Assumptions:
1) All $TiO_2$, was assumed to have refractive index n=2.737.
2) The continuous medium in which the particles were suspended was assumed to have n=1.482.
3) The solid bead was assumed to have a diameter of 1100 nm and n=1.482.
4) The Hollow Sphere Polymer (HSP) was assumed to have an overall diameter of 1100 nm. The void was assumed to have diameter of 1000 mm. The shell was assumed to be polystyrene, with n=1.59.
5) The thickness of the film in which the particles was dispersed was 25 microns.
6) The $TiO_2$-coated HSP and solid bead concentrations in the film were 5% by volume.
7) In the TiO2-solid bead mixtures, the $TiO_2$ level varied but was equivalent to the amount present from the coated HSP or solid bead. So with a 200 nm coating, this worked out to 5%×(1−((1100/1500)^3))=3.03% by volume. (1500=total diameter of coated bead)

Method for Calculations:
1) Used the Mie Theory to calculate the scattering pattern for a single isolated particle.
2) Used the angular distribution of light scattering and strength of scattering from Mie theory and applied in a system of multiple particles to determine the probability and direction of how the light will scatter.
3) Applied a Monte Carlo multiple scattering procedure described by Bailey, A. E.; Cannell, D. S. *Phys. Rev. E*, 1994, 50, 4853-4864 and Cipelletti, L. *Phys. Rev. E*, 1997, 55, 7733-7740 wherein:
   a) A photon hits the front surface of the film from the normal direction.
   b) Once inside the film, the photon travels until it hits a particle. The distance which the photon travels before the next scattering event, as well as the scattering direction, are chosen based on the particle characteristics and concentration.
   c) The travel-scatter sequence is repeated until the photon hits the back surface of the film or turns around.
   d) Photons which turn around are counted as backscattered. Photons which reach the back surface are counted as forward scattered.

The results are shown in FIG. 1.

Comparative Example 2

Theoretical Calculations of Backscattering of Various Bead Types—$TiO_2$ Particle=160 Nm The same plot assumptions and method for calculations of Comparative Example 1 were used here.

Figure 2:
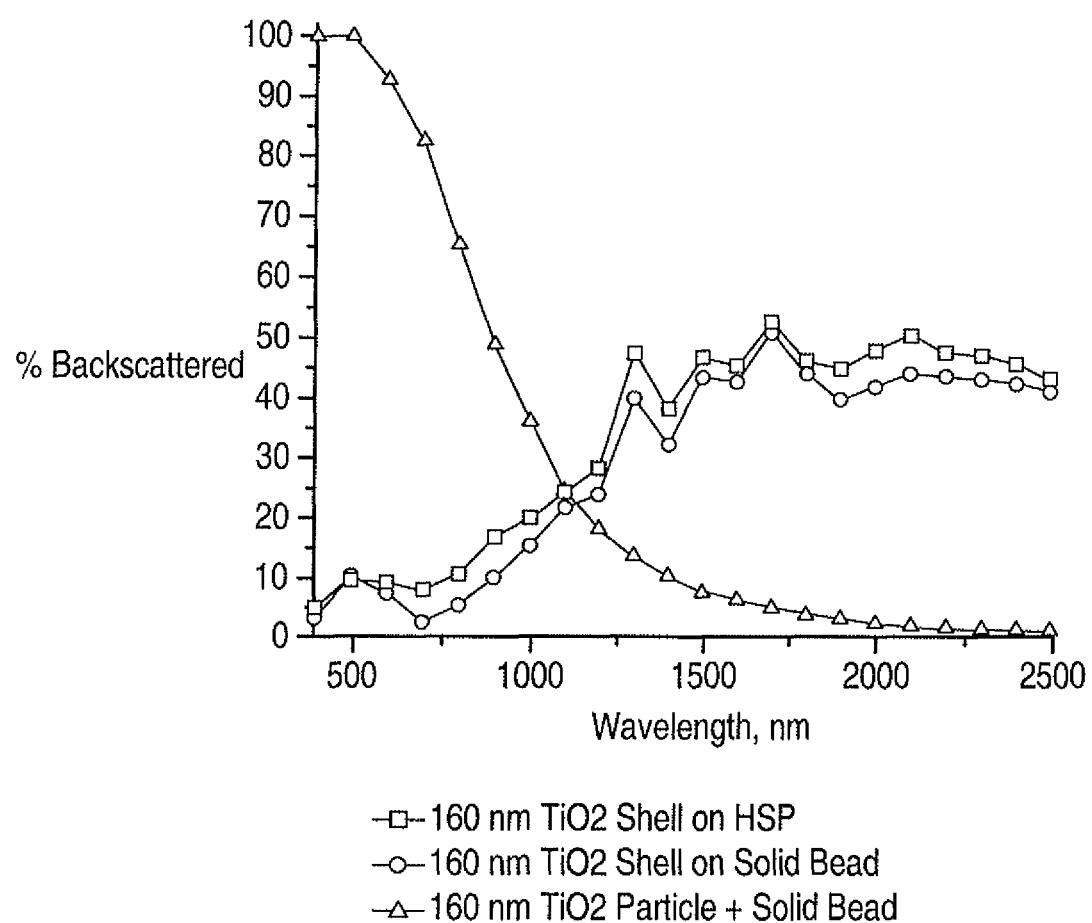
FIG. 2 shows theoretical calculations of backscattering of various bead types where the $TiO_2$ particle has a diameter=160 nm

The results are shown in FIG. 2.

Comparative Example 3

Theoretical Calculations of Backscattering of Various Bead Types—$TiO_2$ Particle=200 Nm The same plot assumptions and method for calculations of Comparative Example 1 were used here.

Figure 3:
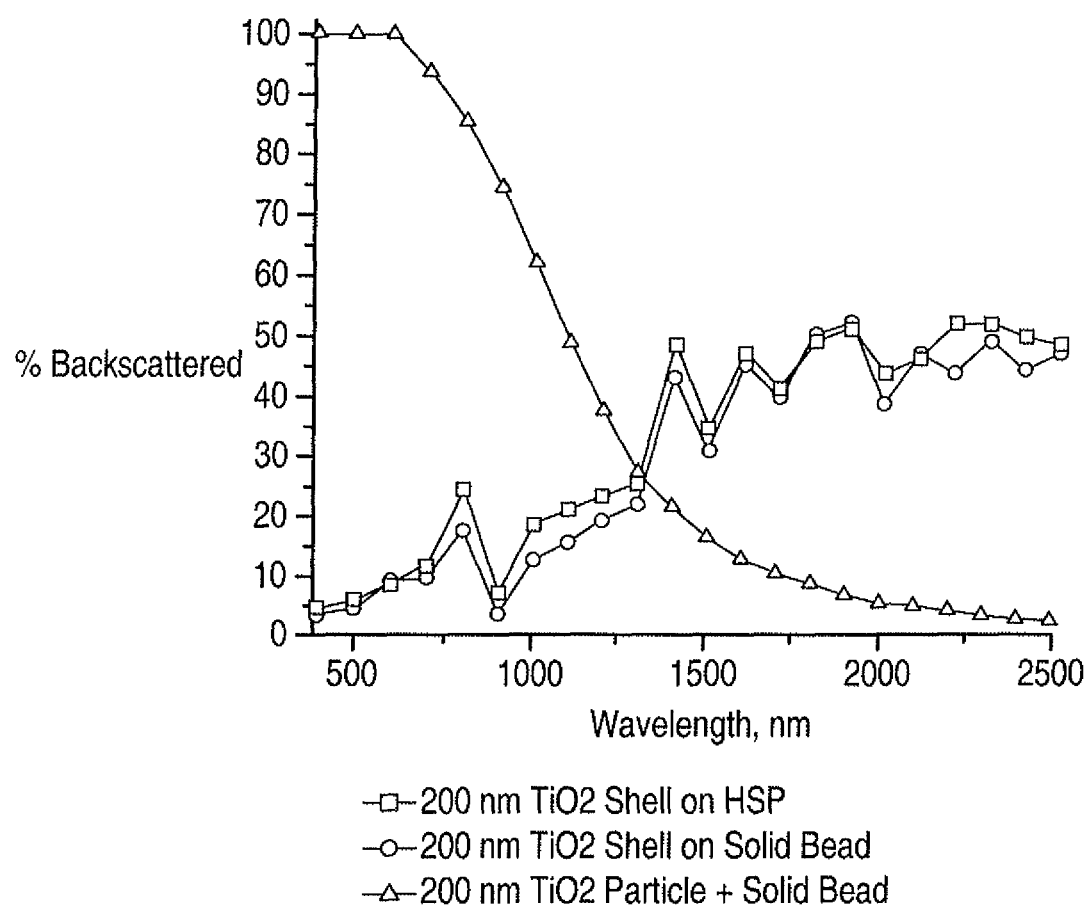
FIG. 3 shows theoretical calculations of backscattering of various bead types where the $TiO_2$ particle has a diameter=200 nm

The results are shown in FIG. 3.

We claim:

1. An optical bandpass filter comprising:
    a composite particle
    wherein the composite particle comprises a polymeric particle and a high refractive index material,
    wherein there is a polyelectrolyte between the polymeric particle and the high refractive index material;
    and further wherein the polyelectrolyte bears a charge which is opposite of the charges of the polymeric particle and the high refractive index material; and
    wherein the polymeric particle has a diameter ranging from 100 nm to 3.5 microns;
    and the high refractive index material is disposed over the surface of the polymeric particle; wherein the polymeric particle comprises a core and a shell; and wherein the core, when dry, comprises at least one void.

2. A photovoltaic solar module comprising the optical bandpass filter of claim 1.

3. A window comprising the optical bandpass filter of claim 1.

4. A roof comprising the optical bandpass filter of claim 1.

5. A film or a coating comprising the optical bandpass filter of claim 1.

* * * * *